US008117412B2

(12) United States Patent
Costin et al.

(10) Patent No.: US 8,117,412 B2
(45) Date of Patent: Feb. 14, 2012

(54) SECURING SAFETY-CRITICAL VARIABLES

(75) Inventors: Mark H. Costin, Bloomfield Township, MI (US); Mingguang Yu, West Bloomfield, MI (US); James T. Kurnik, Linden, MI (US); Trenton W. Haines, Novi, MI (US); Paul A. Bauerle, Fenton, MI (US)

(73) Assignee: GM Global Technology Operations LLC

( * ) Notice: Subject to any disclaimer, the term of this patent is extended or adjusted under 35 U.S.C. 154(b) by 645 days.

(21) Appl. No.: 12/259,587

(22) Filed: Oct. 28, 2008

(65) Prior Publication Data

US 2009/0235019 A1 Sep. 17, 2009

Related U.S. Application Data

(60) Provisional application No. 61/035,901, filed on Mar. 12, 2008.

(51) Int. Cl.
*G06F 12/00* (2006.01)
*G06F 13/00* (2006.01)
*G06F 13/28* (2006.01)

(52) U.S. Cl. ...................... 711/163; 711/152

(58) Field of Classification Search .......... 711/163–164, 711/152
See application file for complete search history.

(56) References Cited

U.S. PATENT DOCUMENTS

| 5,574,922 A * | 11/1996 | James ............................ 712/220 |
| 2004/0236918 A1 | 11/2004 | Okaue et al. |
| 2006/0095669 A1 | 5/2006 | Day et al. |
| 2006/0161749 A1 * | 7/2006 | Chen et al. ...................... 711/164 |
| 2007/0005919 A1 * | 1/2007 | van Riel ......................... 711/163 |
| 2008/0189557 A1 * | 8/2008 | Pipitone et al. ................ 713/193 |

FOREIGN PATENT DOCUMENTS

| CN | 1556953 A | 12/2004 |
| CN | 1766853 A | 5/2006 |

\* cited by examiner

*Primary Examiner* — Jared Rutz
*Assistant Examiner* — Ryan Bertram

(57) ABSTRACT

A system comprises a general-purpose memory, a lockable memory, a memory management unit, and a processor. The general-purpose memory includes data for a first set of addresses. The lockable memory includes data for a second set of addresses. The memory management unit selectively writes data to one of the general-purpose memory and the lockable memory and selectively locks the lockable memory by preventing writes to the lockable memory. The processor instructs the memory management unit to unlock the lockable memory before requesting a write to one of the second set of addresses.

18 Claims, 4 Drawing Sheets

SECURING SAFETY-CRITICAL VARIABLES

CROSS-REFERENCE TO RELATED APPLICATIONS

This application claims the benefit of U.S. Provisional Application No. 61/035,901, filed on Mar. 12, 2008. The disclosure of the above application is incorporated herein by reference.

FIELD

The present disclosure relates to securing safety-critical variables, and more particularly to securing safety-critical variables in memory of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1A, a functional block diagram of a processor system according to the prior art is presented. A processor 100 executes instructions and reads and stores data. The data may be stored in a memory 104. In various implementations, the processor 100 may execute instructions from the memory 104 or from another memory (not shown), which may include flash memory or read only memory.

When the processor 100 writes safety-critical variables to the memory 104, the processor 100 uses a dual store module 108. Safety-critical variables may include throttle position, for example. If the stored value of the desired throttle position is erroneously increased, an increase in torque that the driver was not expecting may occur. The dual store module 108 therefore stores two copies of safety-critical variables from the processor 100 into the memory 104. These copies can be compared to detect inadvertent changes to one or the other of the copies.

A direct memory access (DMA) module 112 communicates with the memory 104. In various implementations, the DMA module 112 may be located on the bus between the dual store module 108 and the memory 104. The DMA module 112 transfers data to and from the memory 104 on behalf of peripherals 116. The DMA module 112 allows for memory transfers without burdening the processor 100.

Referring now to FIG. 1B, a functional block diagram of the memory 104 is shown. The dual store module 108 may store copies of the safety-critical variables into two memory blocks. For example, a first variable may be stored at 120-1 and at 120-2. This dual storage may also be performed for variable 2, variable 3, and so on.

When the processor 100 requests a read of one of the safety-critical variables, the dual store module 108 compares the two values read from the memory 104. A difference between the two values will signal an error condition. For example, a discrepancy between values of a desired throttle position may cause the processor 100 to choose the lower of the two throttle positions.

SUMMARY

A system comprises a general-purpose memory, a lockable memory, a memory management unit, and a processor. The general-purpose memory includes data for a first set of addresses. The lockable memory includes data for a second set of addresses. The memory management unit selectively writes data to one of the general-purpose memory and the lockable memory and selectively locks the lockable memory by preventing writes to the lockable memory. The processor instructs the memory management unit to unlock the lockable memory before requesting a write to one of the second set of addresses.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
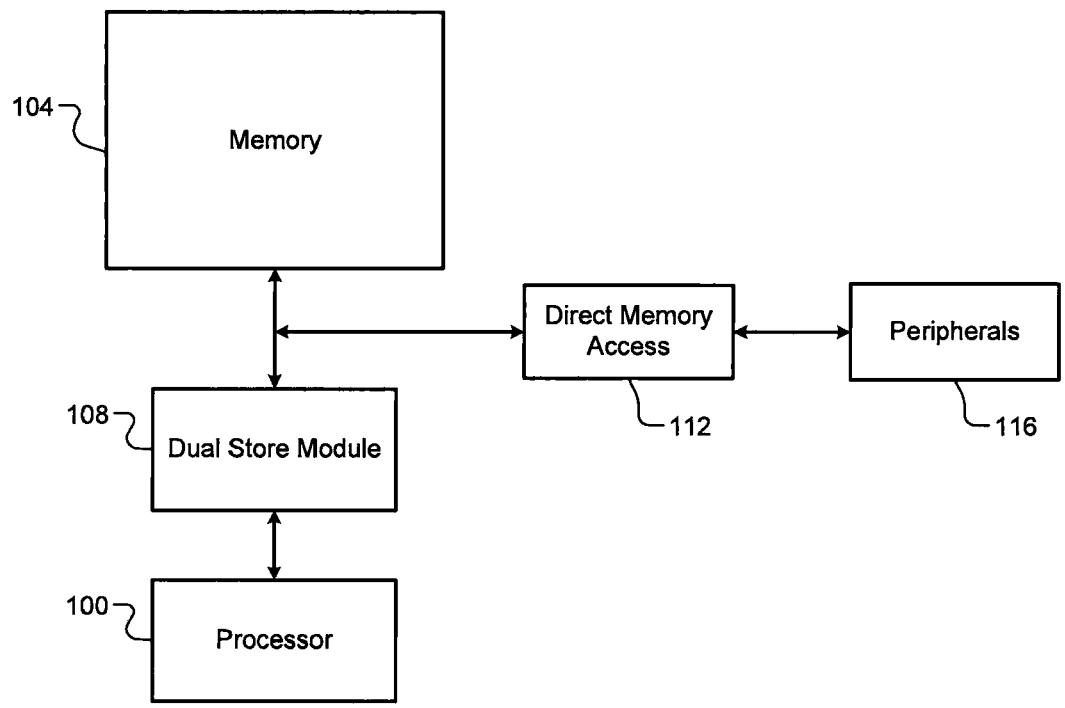
FIG. 1A is a functional block diagram of a processor system according to the prior art.
Figure 1B:
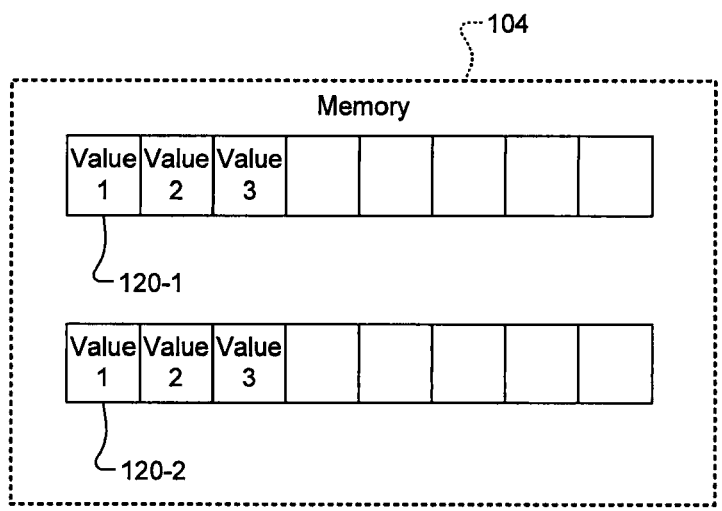
FIG. 1B is a functional block diagram of the memory of FIG. 1A according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2A:
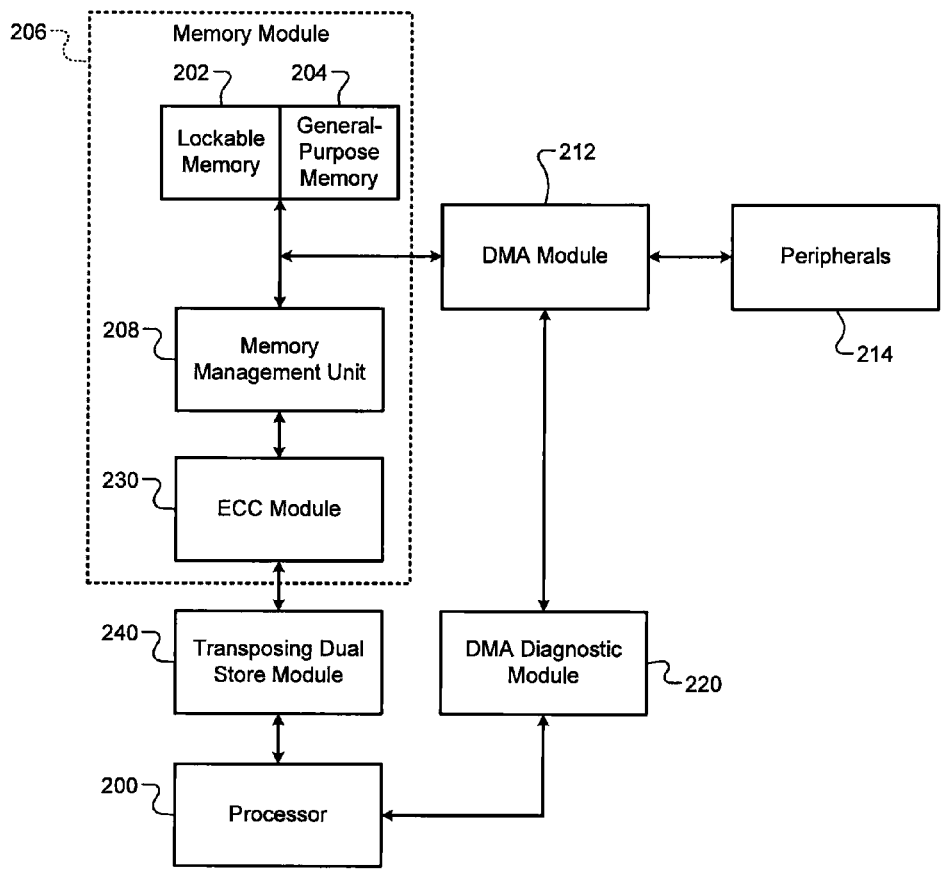
FIG. 2A is a functional block diagram of an exemplary processor system according to the principles of the present disclosure.

Referring now to FIG. 2A, a functional block diagram of an exemplary processor system according to the principles of the present disclosure is presented. A processor 200 stores data within a lockable memory 202 and a general-purpose memory 204 of a memory module 206. The lockable and general-purpose memories 202 and 204 are accessed by a memory management unit (MMU) 208. Access may be prevented to addresses within the lockable memory 202 until a special event occurs, such as an unlock command being received by the MMU 208.

In various implementations, the lockable and general-purpose memories 202 and 204 may be implemented as a single common memory. The MMU 208 may define a section (such as a range of addresses) of the common memory to serve as the lockable memory 202. The remainder of the common memory may then serve as the general-purpose memory 204.

A direct memory access (DMA) module 212 communicates with the lockable and general-purpose memories 202 and 204. The DMA module 212 allows data transfer to and from peripherals 214 without requiring operation of the processor 200. Because the DMA module 212 interacts directly with the lockable and general-purpose memories 202 and 204, the lockable memory 202 may not be protected from writes by the DMA module 212.

To mitigate this vulnerability, a DMA diagnostic module 220 can be actuated by the processor 200. The DMA diagnostic module 220 verifies correct operation of the DMA module 212. For example, the DMA diagnostic module 220 may instruct the DMA module 212 to write data into the lockable memory 202 and/or the general-purpose memory 204 at a specific location. That specific location can then be read by the processor 200 to verify that the DMA module 212 is writing to the correct addresses. For example, operation of the DMA diagnostic module 220 may be initiated upon power-up, at periodic intervals, or at any other time specified by the processor 200.

Data written to the lockable and general-purpose memories 202 and 204 by the processor 200 may be protected by an error-correcting code (ECC) module 230. The ECC module 230 may add an ECC code, such as a checksum or parity bit, to data received from the processor 200. In addition, the ECC module 230 may encode data from the processor 200 using an ECC process, such as Reed-Solomon encoding. When data is read back, the ECC module 230 can check that no errors have been introduced, and possibly correct some or all of the detected errors.

The ECC module 230 may operate on all values written by the processor 200 or on selected values, such as safety-critical variables. Checksums or other values determined by the ECC module 230 may be written into the lockable memory 202, where they will be protected by the MMU 208, or into the general-purpose memory 204. By writing them into the general-purpose memory, the lockable memory 202 can be re-locked as the checksum is still being calculated. This minimized the length of time that the lockable memory 202 remains unlocked.

Variables, such as safety-critical variables, may also be protected by a transposing dual store module 240. The transposing dual store module 240 may write two copies of each variable to the lockable memory 202 and/or the general-purpose memory 204. For example only, the transposing dual store module 240 may write one copy of the variable to the lockable memory 202 and the other copy to the general-purpose memory 204.

Writing to the lockable memory 202 may first require an unlock command to be sent to the MMU 208. Interrupts may be disabled while the lockable memory 202 is unlocked to prevent other routines from accessing the lockable memory 202 while unlocked.

The transposing dual store module 240 may write one copy of a variable to the beginning of one memory block, and write another copy of that same variable to the end of another memory block. For example only, the copies of the variable may be identical or may be variants of each other. For example only, the two copies may be ones' or two's complements of each other. These copies may be referred to as dual values, or duals, of each other.

Figure 2B:
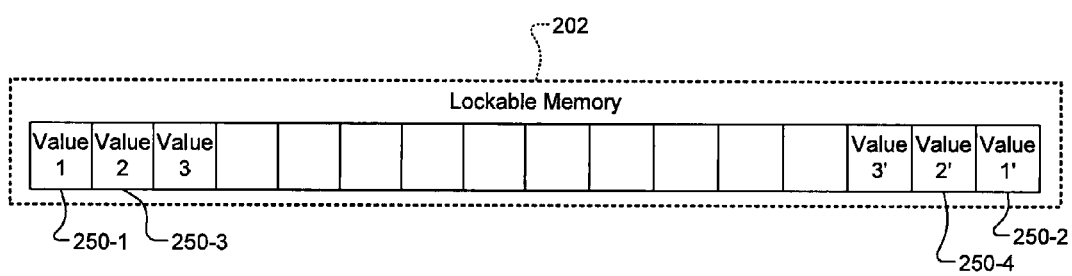
FIG. 2B is an exemplary layout of the lockable memory of FIG. 2A according to the principles of the present disclosure.

Referring now to FIG. 2B, an exemplary layout of the lockable memory 202 is shown. The data value written for the first variable may be written to the location 250-1, while the dual of that value may be written to the location 250-2. For example, the dual may be the ones' complement or the two's complement. Variable 2 may be written to the location 250-3, adjacent to variable 1, while the dual of variable 2 may be written to the location 2504, adjacent to the dual of variable 1.

During a read, the transposing dual store module 240 verifies that the stored value and its stored dual are equivalent. If they are not, the processor 200 may take remedial action. Remedial action may also be taken when the ECC module 230 identifies an error, even if that error has been corrected by the ECC module 230.

For example, remedial action may include using a default value for the variable that appears to have been corrupted. In addition, remedial action may include setting an engine code or trouble code and illuminating a malfunction indicator light, such as a check engine light. Remedial action may also include attempting to recalculate the variable.

More restrictive remedial actions may include powering down the engine or disabling throttle control, which may allow a throttle valve to return to a default position, such as a high idle position. Remedial action may also include setting the throttle valve to a predetermined idle position that is less than high idle. Remedial action may also include setting a maximum limit for the opening of the throttle valve. Remedial action may also include limiting acceleration and/or power produced by the engine, such as by limiting torque requests to a maximum value. If an error persists or recurs, the processor 100 may escalate from less severe to more severe remedial action.

Figure 3A:
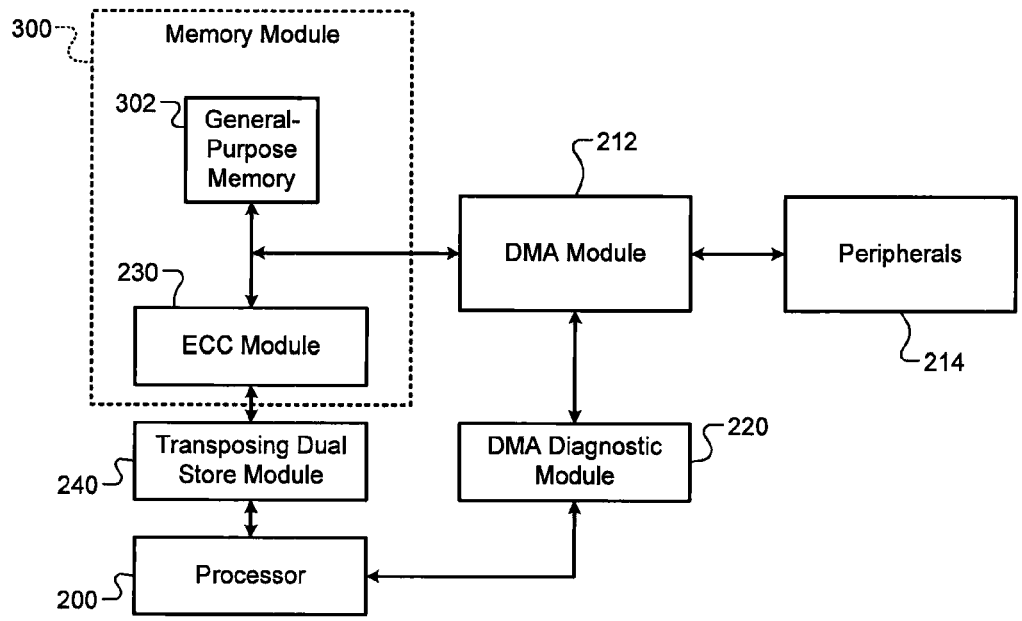
FIGS. 3A-3B are functional block diagrams of further exemplary processor systems according to the principles of the disclosure.
Figure 3B:
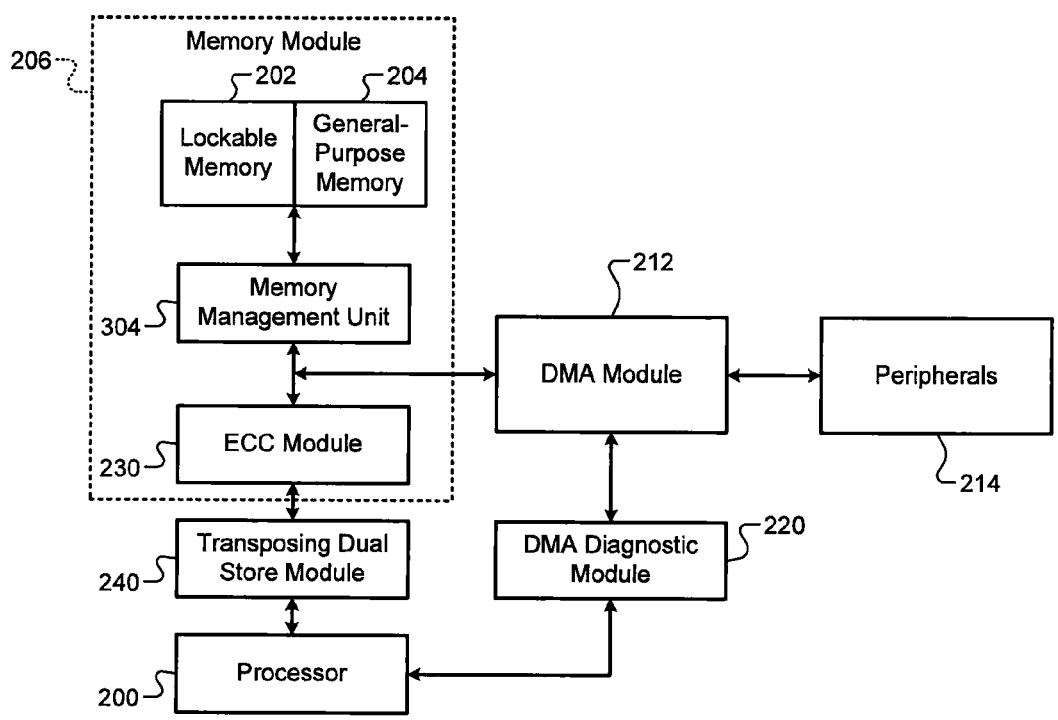

Referring now to FIGS. 3A-3B, functional block diagrams of further exemplary processor systems according to the principles of the disclosure are presented. In FIG. 3A, the MMU 208 is absent and therefore lockable memory has not been defined within a memory module 300. Safety-critical variables are still protected within a general-purpose memory 302 by the ECC module 230 and the transposing dual store module 240. In addition, operation of the DMA module 212 is validated by employing the DMA diagnostic module 220.

In FIG. 3B, a memory management unit (MMU) 304 is located between the lockable and general-purpose memories 202 and 204 and the DMA module 212. The MMU 304 may then protect the lockable memory 202 from erroneous writes by the DMA module 212. In various implementations, attempted writes to the lockable memory 202 from the DMA module 212 may be disabled entirely by the MMU 304. Alternatively, writes to the lockable memory 202 may be allowed when the lockable memory 202 is unlocked.

Alternatively, the MMU 304 may require an unlock command from the DMA module 212 before allowing writes to the lockable memory 202. In various implementations, a reserved address may be used as a signal to the MMU 304 that a legitimate write to the lockable memory 202 is desired. For example, one of the peripherals 214 that has a legitimate need to write to the lockable memory 202 may first perform a dummy access to the reserved address. The MMU 304 may then allow the subsequent write to the lockable memory 202.

Figure 4:
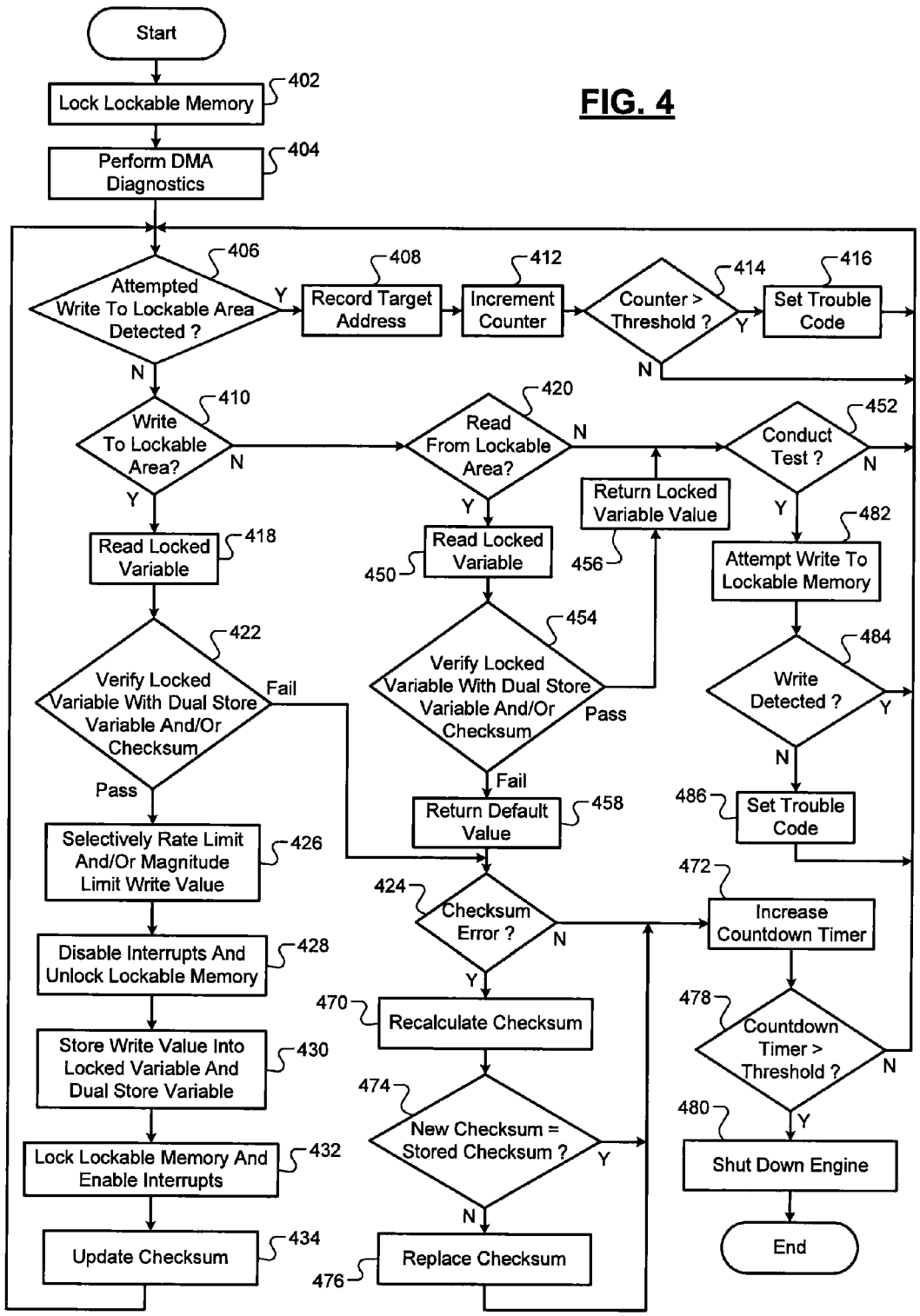
FIG. 4 is a flowchart depicting exemplary operation of the processor system of FIG. 2A according to the principles of the present disclosure.

Referring now to FIG. 4, a flowchart depicts exemplary operation of a processor system such as that shown in FIG. 2A. Control begins in step 402, where a lockable area of memory is locked. In various implementations, the lockable area of the memory may be locked by default. Control continues in step 404, where DMA diagnostics are performed.

The DMA diagnostics may be performed once per key cycle. For example, DMA diagnostics may be performed by commanding a DMA transfer of a known value to a predetermined location of the memory. The predetermined location may be within the lockable area or a general-purpose area of the memory. Alternatively, transfers may be initiated to both the lockable and general-purpose portions.

The predetermined location can then be read and compared to the known value to verify the integrity of the DMA process. A fault during the DMA transfer or an error in the comparison of the read value with the known value may result in a trouble code being set, such as a P0606 code. After the trouble code is set, further remedial action may be performed.

Control continues in step 406, where control determines whether a write has been requested to the lockable area without the appropriate authority. If so, control transfers to step 408; otherwise, control transfers to step 410. The appropriate authority may be determined by whether the write was initiated by a standard write routine or by a lockable write routine. The standard write routine would not have the authority to modify lockable memory.

In step 408, the target address of the write may be recorded for diagnostic purposes. Because the write was not authorized, no data is written to the target address. Control continues in step 412, where a counter is incremented. The counter may be reset to zero upon engine start-up. Control then continues in step 414, where control determines whether the counter is greater than a threshold. If so, control transfers to step 416; otherwise, control returns to step 406.

In step 416, a trouble code is set. For example, a P0604 code may be set. When a trouble code is set, a malfunction indicator light may be illuminated. In addition, other remedial actions may be performed. In various implementations, the remedial action performed may be based on the value of the counter. As the value of the counter increases, the severity of the remedial action may increase.

In step 410, control determines whether an authorized write to a lockable area is desired. If so, control transfers to step 418; otherwise, control transfers to step 420. In step 418, control reads the variable from the lockable area of memory. Control continues in step 422, where control verifies the locked variable with a dual store variable and/or a checksum. In various implementations, either dual store variables or checksums may be omitted. A single checksum may cover both the locked variable and the dual store variable. Alternatively, the locked variable and the dual store variable may be covered by different checksums.

The dual store variable and/or the checksum may be located in the lockable area of memory. Alternatively, one or both of the dual store variable and the checksum may be located in general-purpose memory. The checksum may cover a section of lockable memory including the locked variable and other locked variables. A checksum value may be calculated and compared to the stored checksum.

A discrepancy between the calculated checksum and the stored checksum may indicate that the locked variable, the checksum, or another variable covered by the checksum has been corrupted. Additionally, the checksum calculation may be erroneous. If the locked variable is inconsistent with the dual store variable or the checksum comparison fails, the write fails and control transfers to step 424. Alternatively (not shown), the write may still be performed, after which control transfers to step 424.

If the locked variable is consistent with the dual store variable and the checksum is correct, control transfers to step 426. In step 426, the value to be written to the locked variable may be rate limited and/or magnitude limited. For example, an upper limit may be imposed on each change in the value of the locked variable. In addition, a maximum value of the locked variable may be defined.

Control continues in step 428, where control disables interrupts and unlocks the lockable area of the memory. Interrupts are disabled so that interrupts cannot be serviced while the lockable memory is unlocked, thereby exposing unlocked memory to other functions. Control continues in step 430, where the write value, which may have been limited in step 426, is stored into the locked variable.

If the dual store variable is stored in lockable memory, the dual store variable may be updated as well. In various implementations, the dual store variable may be the ones' complement of the locked variable. Control continues in step 432, where control locks the lockable memory and re-enables interrupts.

Control continues in step 434, where control updates the checksum. In various implementations, the checksum may be updated by incrementing the previous checksum based upon the stored write value. Alternatively, the checksum may be recalculated from all the variables within the section of memory that the checksum covers. Control then returns to step 406. If the checksum is located within lockable memory, the checksum update may be performed between steps 428 and 432, while the lockable memory is unlocked.

In step 420, control determines whether a qualified read from a lockable memory area is requested. If so, control transfers to step 450; otherwise, control transfers to step 452. In various implementations, a read from locked memory may be initiated via the same routine as a read to any other area of memory. Further, any process may be allowed to read values from the lockable area of memory.

In step 450, the locked variable identified by the read request is read. Control continues in step 454, where control verifies that the locked variable is consistent with the dual stored variable and/or the checksum. If so, control transfers to step 456; otherwise, control transfers to step 458. In step 456, control returns the value from the locked variable and continues in step 452.

In step 458, control returns a default value. This default value may be stored in lockable memory or in general-purpose memory. Alternatively, the default value may be provided by the function requesting the read from the lockable area. In this way, the function specifies the value it will use if the read fails.

Control then continues in step 424. In step 424, if the read or write failure is the result of a checksum error, control transfers to step 470; otherwise, control transfers to step 472. In step 470, control recalculates a checksum and continues in step 474. In step 474, control compares the recalculated checksum to the stored checksum. If they are equal, control transfers to step 472; otherwise, control transfers to step 476. If the new checksum is equal to the stored checksum, the checksum calculated in step 422 or 454 was apparently miscalculated.

In step 476, both the recalculated checksum and the calculated checksum from step 422 or 454 disagree with the stored checksum. The stored checksum may therefore be replaced. In various implementations, the checksum may be replaced when the recalculated checksum matches the calculated checksum. If these checksums are not equal, remedial action may be performed. Control then continues in step 472.

In step 472, control increases the value of a countdown timer. The countdown timer may periodically decrease. Therefore, if the countdown timer has not been increased for a period of time, the countdown timer may reach zero. However, if the countdown timer is increased more frequently, the value in the countdown timer will rise. Control continues in step 478, where control determines whether the value of the countdown timer is greater than a threshold. If so, control transfers to step 480; otherwise, control returns to step 406. In step 480, control performs remedial action. In various implementations, the remedial action may be to shut down the engine, after which control ends.

In step 452, control determines whether a lockable area test should be conducted. If so, control transfers to step 482; otherwise, control returns to step 406. For example only, a test may be performed at periodic intervals. In step 482, control attempts to write to an area in lockable memory. Control continues in step 484, where control determines whether the attempted write was detected as unauthorized. If so, control returns to step 406; otherwise, control transfers to step 486. In step 486, a trouble code may be set. In addition, other remedial action may be performed. Control then returns to step 406.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
a general-purpose memory including data for a first set of addresses;
a lockable memory including data for a second set of addresses;
a memory management unit that selectively writes data to one of the general-purpose memory and the lockable memory, and that selectively locks the lockable memory by preventing writes to the lockable memory; and
a processor that instructs the memory management unit to unlock the lockable memory before requesting a write to one of the second set of addresses,
wherein the processor tests the memory management unit by requesting a sample write to the lockable memory while the lockable memory is locked, and performs remedial action unless the sample write is detected.

2. The system of claim 1 wherein the processor selectively performs remedial action when a write request to the lockable memory is detected while the lockable memory is locked.

3. The system of claim 2 wherein the remedial action includes at least one of initiating an engine shutdown, limiting a torque of the engine, limiting an acceleration of a vehicle, limiting a throttle position of the engine, and setting a trouble code.

4. The system of claim 1 further comprising an error control module that selectively encodes data from the processor, transmits the encoded data to the memory management unit, and checks for errors when the encoded data is received from the memory management unit.

5. The system of claim 1 further comprising a dual store controller that receives a value from the processor, stores a first version of the value at a first end of a first memory region of the lockable memory, and stores a second version of the value at a first end of a second memory region of the lockable memory.

6. The system of claim 5 wherein the first and second versions are one of copies of each other, ones' complements of each other, and two's complements of each other.

7. The system of claim 5 wherein the first and second memory regions are adjacent, and the first ends of the first and second memory regions are at distal ends.

8. The system of claim 1 further comprising:
a direct memory access (DMA) module that directly accesses the general-purpose memory and the lockable memory; and
a DMA diagnostic module that selectively tests operation of the DMA module by instructing a predetermined value to be written to a selected address of one of the first and second sets of addresses, and comparing a value read from the selected address to the predetermined value.

9. The system of claim 1 wherein the processor disables interrupts while the lockable memory is unlocked and instructs the memory management unit to lock the lockable memory after requesting the write.

10. A method comprising:
storing data for a first set of addresses;
storing data for a second set of addresses;
selectively locking the second set of addresses by preventing writes to the second set of addresses;
unlocking the second set of addresses before requesting a write to one of the second set of addresses;
requesting a sample write to the second set of addresses while the second set of addresses is locked; and
performing remedial action unless the sample write is detected.

11. The method of claim 10 further comprising selectively performing remedial action when an attempted write to the second set of addresses is detected while the second set of addresses is locked.

12. The method of claim 11 wherein the remedial action includes at least one of initiating an engine shutdown, limiting a torque of the engine, limiting an acceleration of a vehicle, limiting a throttle position of the engine, and setting a trouble code.

13. The method of claim 10 further comprising:
selectively encoding data to be written;
writing the encoded data;
reading the encoded data; and
checking the encoded data that was read for errors.

14. The method of claim 10 further comprising:
storing a first version of a value at a first end of a first memory region of the second set of addresses; and
storing a second version of the value at a first end of a second memory region of the second set of addresses.

15. The method of claim 14 wherein the first and second versions are one of copies of each other, ones' complements of each other, and two's complements of each other.

16. The method of claim 14 wherein the first and second memory regions are adjacent, and the first ends of the first and second memory regions are at distal ends.

17. The method of claim 10 further comprising:
directly accesses the first and second sets of addresses via direct memory access (DMA);
instructing a transfer of a predetermined value to a selected address of one of the first and second sets of addresses;
reading the selected value; and
comparing the value read to the predetermined value.

18. The method of claim 10 further comprising:
disabling interrupts while the second set of addresses is unlocked; and
locking the second set of addresses after requesting the write.

* * * * *